US009489565B2

(12) United States Patent
Tatsuzawa et al.

(10) Patent No.: US 9,489,565 B2
(45) Date of Patent: Nov. 8, 2016

(54) IMAGE PROCESSING APPARATUS, IMAGE PROCESSING METHOD, PROGRAM, AND IMAGE PROCESSING SYSTEM

(75) Inventors: Shigeru Tatsuzawa, Tokyo (JP); Shunsuke Ichihara, Chiba (JP); Makoto Masuda, Saitama (JP); Hiroyuki Hota, Saitama (JP); Kouhei Endou, Gunma (JP); Kenji Murakami, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 123 days.

(21) Appl. No.: 14/348,576

(22) PCT Filed: Aug. 31, 2012

(86) PCT No.: PCT/JP2012/072165
§ 371 (c)(1),
(2), (4) Date: Jun. 24, 2014

(87) PCT Pub. No.: WO2013/047083
PCT Pub. Date: Apr. 4, 2013

(65) Prior Publication Data
US 2014/0314278 A1    Oct. 23, 2014

(30) Foreign Application Priority Data

Sep. 28, 2011    (JP) ................................ 2011-212691

(51) Int. Cl.
*G06K 9/00*    (2006.01)
*G06K 9/60*    (2006.01)
(Continued)

(52) U.S. Cl.
CPC ............. *G06K 9/00255* (2013.01); *G06K 9/60* (2013.01); *G06T 7/0081* (2013.01);
(Continued)

(58) Field of Classification Search
CPC ............... G06T 7/0081; G06T 7/0097; G06T 2207/10028; G06T 2207/10152; G06T 2207/20144; G06T 2207/30201; G06K 9/00255; G06K 9/60; G06K 9/00221; G06K 9/00228; G06K 2207/1013; G06K 9/00771; G06K 9/3233
USPC .................................................. 382/103, 118
See application file for complete search history.

(56) References Cited

U.S. PATENT DOCUMENTS 6,639,998 B1 * 10/2003 Lee ..................... G06K 9/00228
382/103
2008/0129844 A1 * 6/2008 Cusack .............. H04N 5/23245
348/241

(Continued)

FOREIGN PATENT DOCUMENTS

JP    2001-145101 A    5/2001
JP    2004-265432 A    9/2004
(Continued)

OTHER PUBLICATIONS

Muñoz-Salinas et al. "People Detection and Tracking Using Stereo Vision and Color." Image and Vision Computing, vol. 25, Issue 6, Jun. 1, 2007, pp. 995-1007.*

*Primary Examiner* — Jon Chang
(74) *Attorney, Agent, or Firm* — Rabin & Berdo, P.C.

(57) ABSTRACT

An image processing apparatus including a region-of-interest decision unit that identifies an interest space region in which an object to be analyzed is likely to be present based on a distance image, which is shape information of an object space corresponding to a captured image to be analyzed acquired by a distance image sensor, to identify a region of interest in the captured image corresponding to the interest space region and an image analysis unit that performs different image analyses for the region of interest and other image regions.

11 Claims, 16 Drawing Sheets

(51) Int. Cl.
*G06T 7/00* (2006.01)
*G06K 9/32* (2006.01)

(52) U.S. Cl.
CPC ........ *G06T 7/0097* (2013.01); *G06K 9/00771* (2013.01); *G06K 9/3233* (2013.01); *G06K 2207/1013* (2013.01); *G06T 2207/10028* (2013.01); *G06T 2207/10152* (2013.01); *G06T 2207/20144* (2013.01); *G06T 2207/30201* (2013.01)

(56) References Cited

U.S. PATENT DOCUMENTS

| | | | |
|---|---|---|---|
| 2009/0192647 A1* | 7/2009 | Nishiyama | B25J 9/0003 700/215 |
| 2009/0290758 A1* | 11/2009 | Ng-Thow-Hing | G06T 7/0042 382/106 |
| 2011/0026772 A1 | 2/2011 | Hagan et al. | |
| 2012/0062749 A1* | 3/2012 | Kawahata | G06K 9/00201 348/152 |

FOREIGN PATENT DOCUMENTS

| | | |
|---|---|---|
| JP | 2006-048435 A | 2/2006 |
| JP | 2009-156776 A | 7/2009 |
| JP | 2010-063001 A | 3/2010 |
| JP | 2010-271306 A | 12/2010 |
| JP | 2011-518383 A | 6/2011 |
| JP | 2011-185664 A | 9/2011 |

\* cited by examiner

FIG. 17

| DETECTION ID | CHARACTERISTIC QUANTITY | DETECTION PLACE | DETECTION TIME |
|---|---|---|---|
| 1 | CHARACTERISTIC QUANTITY A | P1 | 2011/8/1 10:05 |
| 2 | CHARACTERISTIC QUANTITY B | P1 | 2011/8/1 10:08 |
| 3 | CHARACTERISTIC QUANTITY A' | P2 | 2011/8/1 10:12 |
| 4 | CHARACTERISTIC QUANTITY a | P4 | 2011/8/1 10:15 |
| 5 | CHARACTERISTIC QUANTITY B' | P3 | 2011/8/1 10:30 |
| 6 | CHARACTERISTIC QUANTITY b | P4 | 2011/8/1 10:34 |
| ... | ... | ... | ... |

IMAGE PROCESSING APPARATUS, IMAGE PROCESSING METHOD, PROGRAM, AND IMAGE PROCESSING SYSTEM

TECHNICAL FIELD

The present invention relates to an image processing apparatus, an image processing method, a program, and an image processing system.

BACKGROUND ART

In recent years, an image processing technology that analyzes an image acquired by an imaging apparatus to detect persons contained in the image is widely used. According to such an image processing technology, the number of persons passing through the entrance/departure gate can be counted by installing an imaging apparatus in the entrance/departure gate of, for example, a station, airport, amusement area, theater, hall or the like. In addition, as described in Patent Literature 1, person tracking can be realized by using image processing.

The face detection of a person will briefly be described here. The process of the face detection of a person mainly includes matching processing to verify whether each region in an image matches predetermined face patterns and analysis processing to analyze a matching region in detail by face authentication or the like. Because the size of a face in an image changes depending on the imaging distance of a person, the above matching processing is performed for face patterns of various sizes.

On the other hand, as disclosed in, for example, Patent Literature 2, a distance image sensor that generates a distance image representing the distance of each position in an object space is also under development. In the distance image sensor, for example, photoreceptors corresponding to pixels are arranged in a matrix shape. Then, the distance image sensor can measure the relative distance between an object having reflected light and the distance image sensor in each position corresponding to a pixel in the object space by radiating light and measuring the time needed for the light reflected by the object to return for each pixel.

CITATION LIST

Patent Literature

Patent Literature 1: JP 2010-63001A
Patent Literature 2: JP 2010-271306A

SUMMARY OF INVENTION

Technical Problem

The above face detection processing has a problem in terms of the processing load and detection accuracy. For example, the matching processing for face detection is performed, as described above, for all combinations of each region in the image and face patterns of various sizes, leading to a high processing load. A face pattern in an image is detected as a face and thus, if a person wearing a shirt on which a face photo is printed is present, a portion of the face photo is expected to be erroneously detected as a face portion. Alternatively, the face of a doll placed in the immediate vicinity of an imaging apparatus and the face of a person located in a distant place have similar sizes in an image and the matching processing for face detection is expected to be unable to distinguish both faces.

The present invention is made in view of the above problems. An object of the present invention is to provide a novel and improved image processing apparatus capable of improving the processing load and accuracy of image analysis, an image processing method, a program, and an image processing system.

Solution to Problem

In order to solve the above-mentioned issues, according to an embodiment of the present invention, there is provided an image processing apparatus including a region-of-interest decision unit that identifies an interest space region in which an object to be analyzed is likely to be present based on a distance image, which is shape information of an object space corresponding to a captured image to be analyzed acquired by a distance image sensor, to identify a region of interest in the captured image corresponding to the interest space region, and an image analysis unit that performs different image analyses for the region of interest and other image regions.

The image analysis unit may perform analysis processing by matching processing on the region of interest.

The image analysis unit may change a selection range of patterns used for the analysis processing by pattern recognition of the region of interest based on relative distance information between an imaging apparatus supplying the captured image and the interest space region identified based on the distance image.

An analysis result of the distance image may contain position information of a person detected from the distance image. The region-of-interest decision unit may decide a region corresponding to the position information of the person in the captured image as the region of interest.

The position information of the person may be the position information of a three-dimensional coordinate system obtained by transforming the position information of a sensor coordinate system in the distance image of the person based on first coordinate transformation data. The image processing apparatus may further include a storage unit that stores second coordinate transformation data showing a correspondence between the position information of the three-dimensional coordinate system and each region in the captured image. The region-of-interest decision unit may decide the region of interest by determining the region in the captured image corresponding to the position information of the three-dimensional coordinate system of the person based on the second coordinate transformation data.

The region-of-interest decision unit may decide a size of the region of interest in accordance with a relative distance between the person estimated from the position information of the three-dimensional coordinate system of the person and the imaging apparatus.

The image processing apparatus may further include an evaluation unit that evaluates reliability of the first coordinate transformation data or the second coordinate transformation data based on the analysis result of the region of interest by the image analysis unit, and a notification unit that makes an error notification when the reliability of the first coordinate transformation data or the second coordinate transformation data is evaluated as damaged.

The image processing apparatus may further include a calibration execution unit that acquires the first coordinate transformation data or the second coordinate transformation data by calibration, and a data correction unit that corrects the first coordinate transformation data or the second coordinate transformation data acquired by the calibration execution unit based on the analysis result of the region of interest by the image analysis unit.

A plurality of the imaging apparatuses that images the object space from different directions may be arranged for the one distance image sensor. The region-of-interest decision unit may decide the region of interest of the captured image acquired by the imaging apparatus present, among the plurality of imaging apparatuses, in an orientation of a face of the person.

The image processing apparatus may further include a communication unit that communicates with a plurality of pairs of the distance image sensor and the imaging apparatus, and an identity determination unit that compares the analysis result of a person contained in the captured image acquired by the one imaging apparatus and the analysis result of a person contained in the captured image acquired by the other imaging apparatus to determine an identity of the persons contained in the both captured images.

The image processing apparatus may further include an image compression unit that compresses the captured image such that a data rate of a surrounding region of the region of interest is lower than the data rate of the region of interest.

In order to solve the above-mentioned issues, according to another embodiment of the present invention, there is provided an image processing method including identifying an interest space region in which an object to be analyzed is likely to be present based on a distance image, which is shape information of an object space corresponding to a captured image to be analyzed acquired by a distance image sensor, to identify a region of interest in the captured image corresponding to the interest space region, and performing different image analyses for the region of interest and other image regions.

In order to solve the above-mentioned issues, according to another embodiment of the present invention, there is provided a program causing a computer to function as an image processing apparatus including, a region-of-interest decision unit that identifies an interest space region in which an object to be analyzed is likely to be present based on a distance image, which is shape information of an object space corresponding to a captured image to be analyzed acquired by a distance image sensor, to identify a region of interest in the captured image corresponding to the interest space region, and an image analysis unit that performs different image analyses for the region of interest and other image regions.

In order to solve the above-mentioned issues, according to another embodiment of the present invention, there is provided an image processing system having a distance image sensor that acquires a distance image in which a distance in each position in an object space is represented and an imaging apparatus that images the object space, including identifying an interest space region in which an object to be analyzed is likely to be present based on the distance image acquired by the distance image sensor, deciding a region of interest in a captured image corresponding to the interest space region from the captured image acquired by the imaging apparatus, and performing an image analysis of the region of interest.

Advantageous Effects of Invention

According to the present invention, as described above, the processing load of image analysis can be reduced and also the accuracy of image analysis can be improved.

BRIEF DESCRIPTION OF DRAWINGS

FIG. 17 is an explanatory view showing a concrete example of detection information.

DESCRIPTION OF EMBODIMENTS

Figure 1:
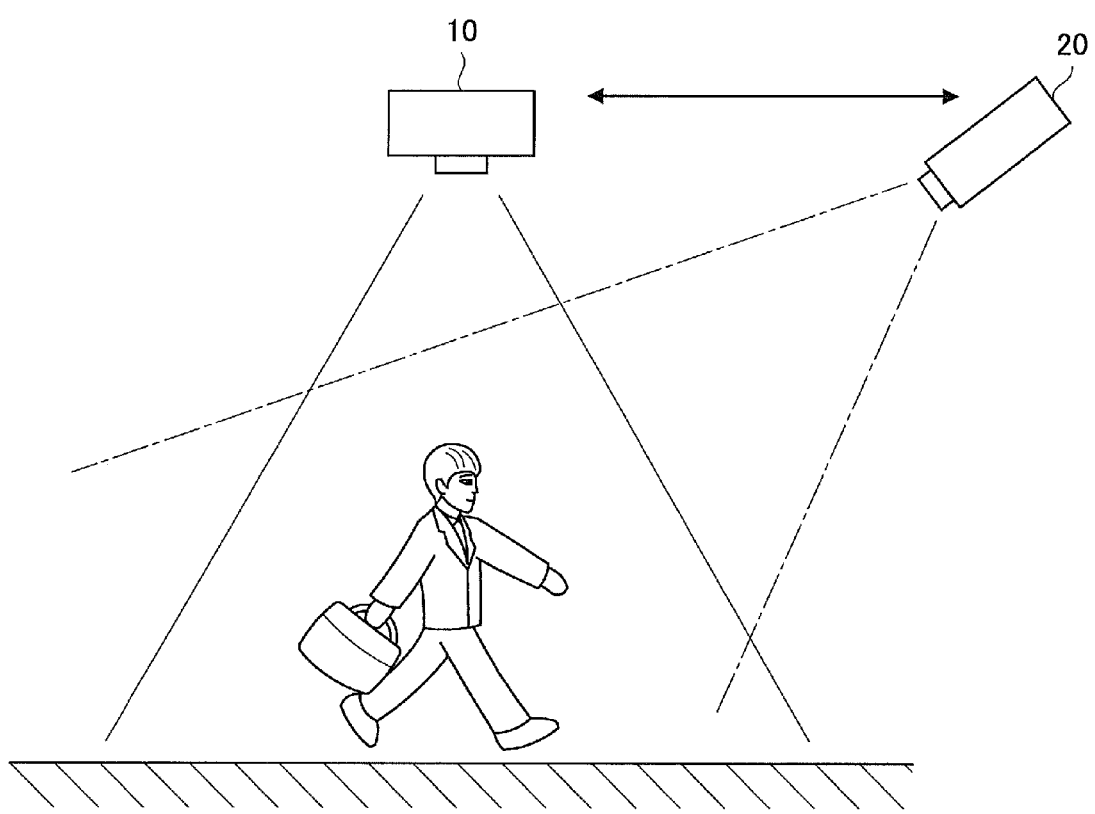
FIG. 1 is an explanatory view showing the configuration of an image processing system according to an embodiment of the present invention.

Hereinafter, preferred embodiments of the present invention will be described in detail below with reference to the appended drawings. Note that, in this specification and the drawings, elements that have substantially the same function and structure are denoted with the same reference signs, and repeated description is omitted.

Also in this specification and the drawings, a plurality of elements having substantially the same function and structure may be distinguished by attaching different alphabets to the end of the same reference sign. However, if there is no particular need to distinguish each of the plurality of elements having substantially the same function and structure, only the same reference sign is attached.

<1. Overview of the Present Embodiment>

As will be described in detail in "3. First Embodiment" to "6. Fourth Embodiment" by way of example, the present invention can be carried out in various forms. An image processing apparatus (for example, an imaging apparatus 20) according to each embodiment includes A. a region-of-interest decision unit (260) that decides a region of interest from a captured image acquired by an imaging apparatus that images an object space based on an analysis result of a distance image in which the distance in each position in the object space acquired by a distance image sensor is represented and B. an image analysis unit (264) that analyzes the image of the region of interest decided by the region-of-interest decision unit.

An image processing system including the image processing apparatus as described above can detect, for example, a person present in an object space with high precision. Therefore, an image processing system according to the present embodiment can be applied to various uses.

For example, an image processing system according to the present embodiment can be applied to the use of counting the number of persons passing through the entrance/departure gate of a station, airport, amusement area, theater, hall or the like. Also, an image processing system according to the present embodiment can be applied to the use of monitoring to prevent a person from erroneously entering a dangerous place such as a dangerous area in a factory, a boundary between the platform and track (or on the track) of a railway station and the like. Further, an image processing system according to the present embodiment can be applied to the use of so-called personal monitoring that detects passage or staying of persons on an elevator, in the premises of a station, near ATMs of a bank, in a retail shop such as a convenience store. The present embodiment relates to the face detection of a person, but can also be applied to high-precision detection of automobiles and the like other than persons.

The basic configuration of an image processing system common to each of such embodiments will be first described below and then each embodiment of the present invention will be described one by one in detail.

<2. Basic Configuration of Image Processing System>

FIG. 1 is an explanatory view showing the configuration of an image processing system according to an embodiment of the present invention. As shown in FIG. 1, an image processing system according to an embodiment of the present invention includes a distance image sensor 10 and the imaging apparatus 20.

(Distance Image Sensor 10)

The distance image sensor 10 measures the relative distance between an object having reflected light and the distance image sensor 10 in each position corresponding to a pixel in the object space by radiating light and measuring the time needed for the light reflected by the object to return for each pixel. Then, the distance image sensor 10 integrates relative distance information obtained by measurement to generate a distance image in which three-dimensional shape information of the object space is represented. Here, a distance image will be described more concretely by referring to FIG. 2.

Figure 2:
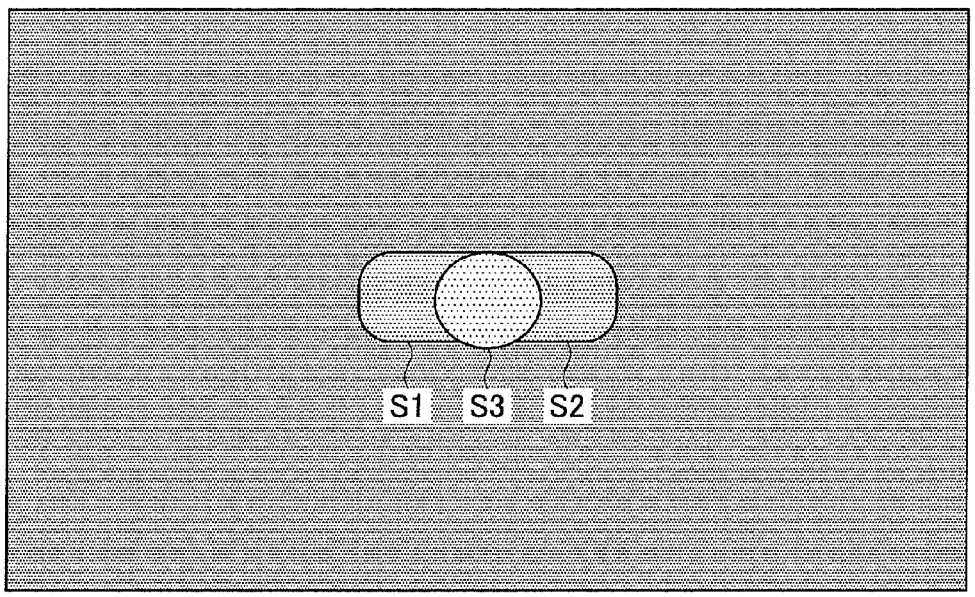
FIG. 2 is an explanatory view showing a concrete example of a distance image.

FIG. 2 is an explanatory view showing a concrete example of the distance image. In FIG. 2, a region with a lighter color has a decreasing distance to the distance image sensor 10 and a region with a darker color has an increasing distance to the distance image sensor 10.

When, as shown in FIG. 2, the distance image sensor 10 makes a distance measurement just from above, shoulders and the head of the person are closer to the distance image sensor 10 than the floor surface. Thus, as shown in FIG. 2, a distance image in which both shoulders S1, S2 and the head S3 are represented by lighter colors than the color of the floor surface is obtained. Due to restrictions on the creation of a drawing, FIG. 2 shows an example in which the distance in each position is represented by the shade of color, but the distance image sensor 10 can also represent the distance of each position by color. The distance image sensor 10 according to the present embodiment analyzes such a distance image and transmits an analysis result to the imaging apparatus 20.

(Imaging Apparatus 20)

On the other hand, the imaging apparatus 20 acquires a captured image of an object space by imaging the object space of the distance image sensor 10. For example, the imaging apparatus 20 forms a light image on an imaging surface by condensing light emitted from the object space and acquires a captured image by converting the light image formed on the imaging surface into an electric image signal.

Figure 3:
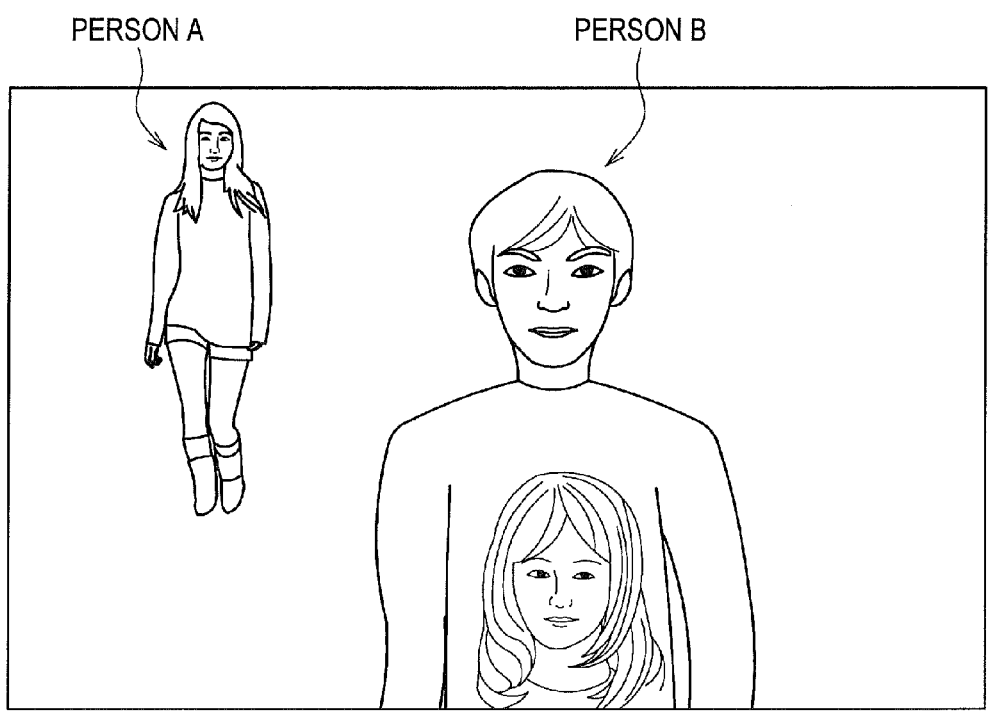
FIG. 3 is an explanatory view showing a concrete example of a captured image.

FIG. 3 is an explanatory view showing a concrete example of a captured image acquired by the imaging apparatus 20. The captured image shown in FIG. 3 contains a person A and a person B positioned in front of the person A and wearing a shirt on which a face photo is printed. Though details will be described later, the imaging apparatus 20 according to the present embodiment can detect the face of a person from such a captured image with high precision while reducing the processing load.

In the present embodiment, a distance image acquired by the distance image sensor 10 is used for the position detection of a person and a captured image acquired by the imaging apparatus 20 is used for recognition of a person. Thus, the distance image sensor 10 desirably measures the object space from a direction close to the vertical direction as shown in FIG. 1 so that occlusion of a person does not occur. On the other hand, the imaging apparatus desirably images the object space from a direction, as shown in FIG. 1, crossing at least the vertical direction so that a face image of a person can be obtained.

(Background)

Here, face detection processing of a person according to Comparative Example of the present invention will be described. The face detection processing of a person according to Comparative Example mainly includes matching processing to verify whether each region in the captured image matches predetermined face patterns and analysis processing to analyze a matching region in detail by face authentication or the like.

However, as shown in FIG. 3, because the size of a face in a captured image changes depending on the imaging distance of a person, the above matching processing needs to be performed for face patterns of various sizes. If, as shown in FIG. 3, a person wearing a shirt on which a face photo is printed is present, the face detection processing according to Comparative Example may recognize the face photo printed on a shirt as a person's face. That is, the face detection processing of a person according to Comparative Example has a problem in terms of the processing load and detection accuracy of the face.

Then, focusing on the above circumstances led to the creation of an image processing apparatus according to the present embodiment. An image processing system according to the present embodiment can detect the face of a person from a captured image with high precision while reducing the processing load. Each of such embodiments will be described one by one in detail below.

<3. First Embodiment>

[3-1. Configuration of Distance Image Sensor According to First Embodiment]

Figure 4:
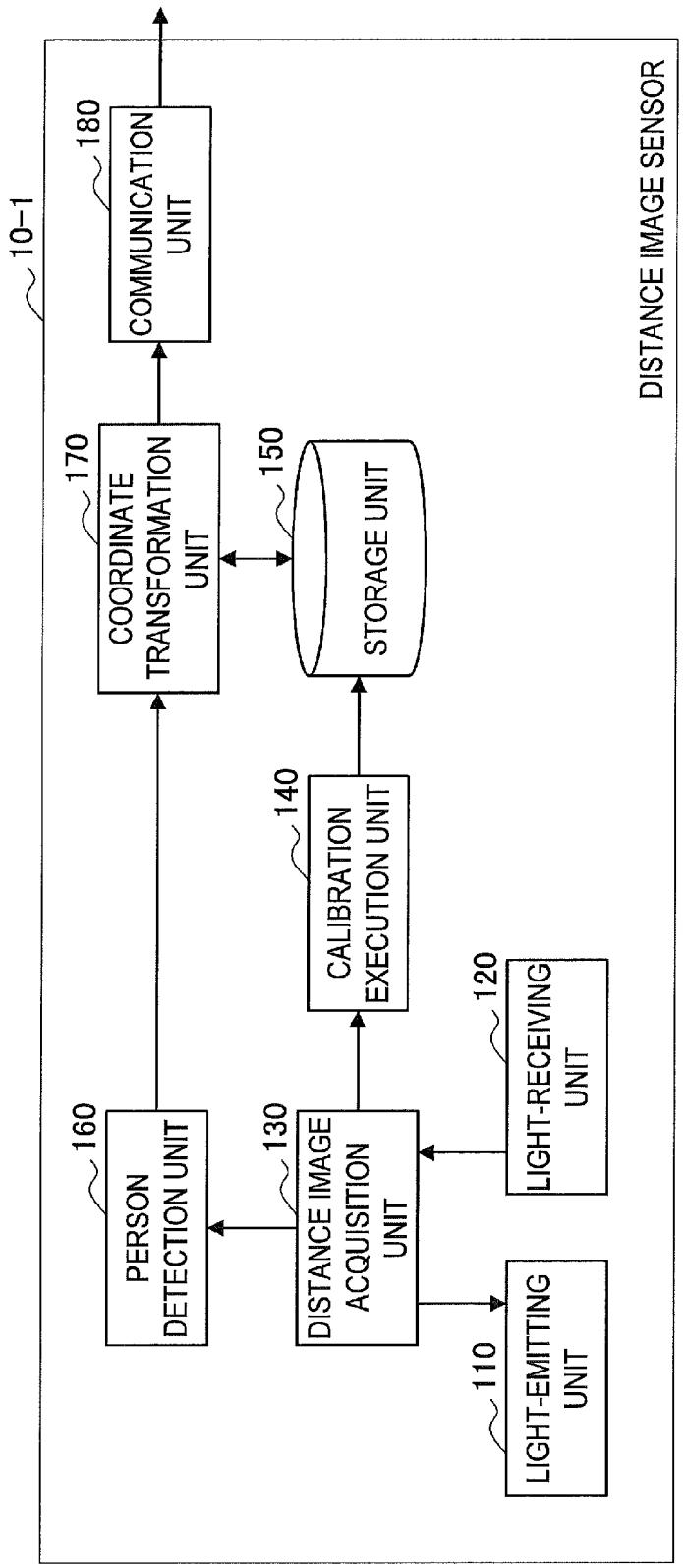
FIG. 4 is a functional block diagram showing the configuration of a distance image sensor 10-1 according to a first embodiment.

FIG. 4 is a functional block diagram showing the configuration of the distance image sensor 10-1 according to the first embodiment. As shown in FIG. 4, the distance image sensor 10-1 according to the first embodiment includes a light-emitting unit 110, a light-receiving unit 120, a distance image acquisition unit 130, a calibration execution unit 140, a storage unit 150, a person detection unit 160, a coordinate transformation unit 170, and a communication unit 180.

The light-emitting unit 110 radiates light of a wavelength that is invisible to naked eyes such as infrared radiation to an object space intended for distance measurement. The light-receiving unit 120 receives reflected light from the object space of the light emitted by the light-emitting unit 110.

The distance image acquisition unit 130 estimates the distance of each position in the object space based on the light receiving result by the light-receiving unit 120 and acquires, as shown in FIG. 2, a distance image in which the distance of each position in the object space is represented by the color or shade.

The calibration execution unit 140 acquires sensor coordinate transformation data (first coordinate transformation data) to transform position information represented by the sensor coordinate system in a distance image acquired by the distance image acquisition unit 130 into position information in the three-dimensional coordinate system like the world coordinate system by carrying out calibrations. The relationship between the sensor coordinate system and the world coordinate system and the calibration will be described with reference to FIG. 5.

Figure 5:
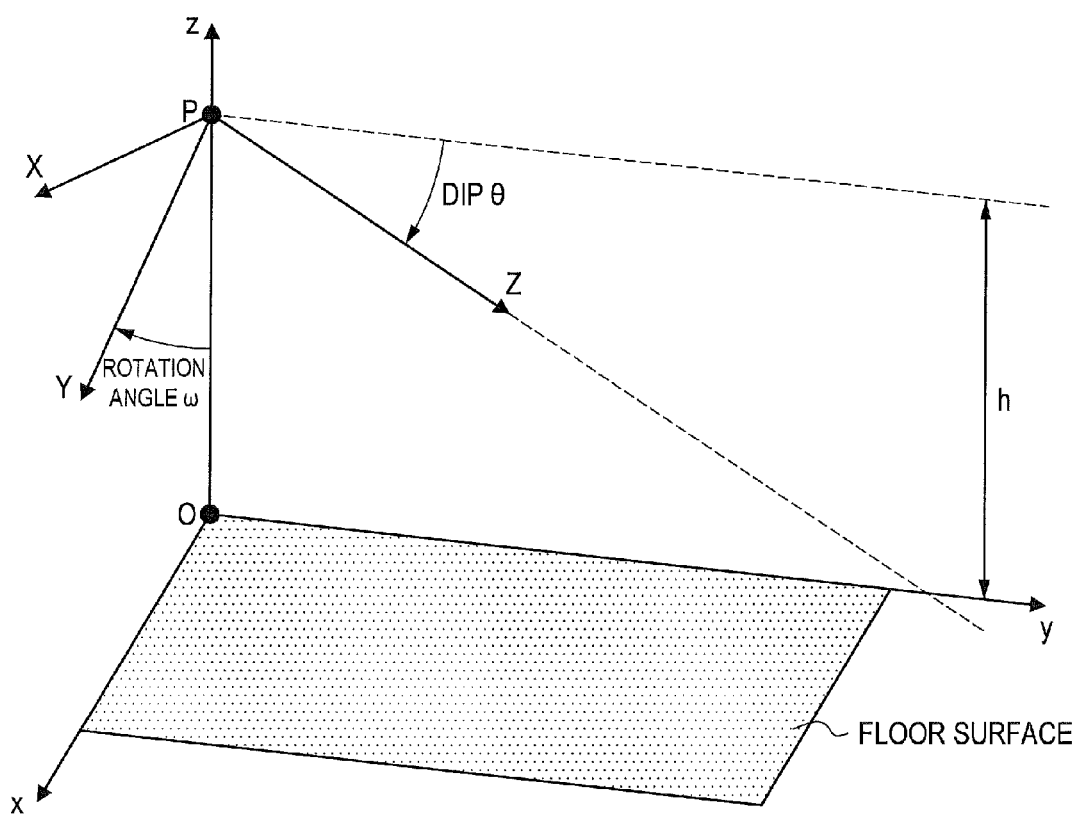
FIG. 5 is an explanatory view showing the relationship between a sensor coordinate system and a world coordinate system.

FIG. 5 is an explanatory view showing the relationship between the sensor coordinate system and the world coordinate system. Position P is an installation position of the distance image sensor 10-1. As shown in FIG. 5, any position in the object space can be acquired in the sensor coordinate system (X, Y, Z) by the distance image acquisition unit 130. However, the sensor coordinate system represents any position by a relative distance from a distance image sensor and is different from the world coordinate system (x, y, z). Thus, the calibration execution unit 140 acquires sensor coordinate transformation data to transform the sensor coordinate system (X, Y, Z) into the world coordinate system (x, y, z) by calibration.

The method of calibration is not particularly limited. For example, the calibration execution unit 140 may estimate, for example, an installation height h of the distance image sensor 10-1, a dip θ, and a rotation angle ω as shown in FIG. 5 based on values in the sensor coordinate system (X, Y, Z) of any three points or more acquired on the floor surface to acquire sensor coordinate transformation data based on the installation height h, the dip θ, and the rotation angle ω. Further, sensor coordinate transformation data can also be set by a person.

Returning to the configuration of the distance image sensor 10-1 with reference to FIG. 4, the storage unit 150 stores sensor coordinate transformation data acquired by the calibration execution unit 140. The storage unit 150 may be a storage medium such as a nonvolatile memory, magnetic disk, optical disk, and MO (Magneto Optical) disk. Nonvolatile memories include, for example, EEPROM (Electrically Erasable Programmable Read-Only Memory) and EPROM (Erasable Programmable ROM). Magnetic disks include a hard disk, disc magnetic substance disk and the like. Optical disks include CD (Compact Disc), DVD-R (Digital Versatile Disc Recordable), BD (Blu-Ray Disc (registered trademark)) and the like.

The person detection unit 160 detects a space in which a person is highly likely to be present as an interest space region based on the shape, size and the like of an object present in a distance image acquired by the distance image acquisition unit 130. For example, the person detection unit 160 may detect a person from a distance image by extracting a difference between the distance image and a background object such as a gate and an installed object and performing processing such as binarization, labeling, and clustering on a difference image. The person detection unit 160 may also detect a person based on, for example, the arrangement of the shoulder S1, the head S3, and the shoulder S2 as shown in FIG. 2 according to Haar-like feature detection. When, as shown in FIG. 1, the distance image sensor 10 measures the distance just above a person, the person detection unit 160 can detect the head of the person with high precision.

Figure 6:
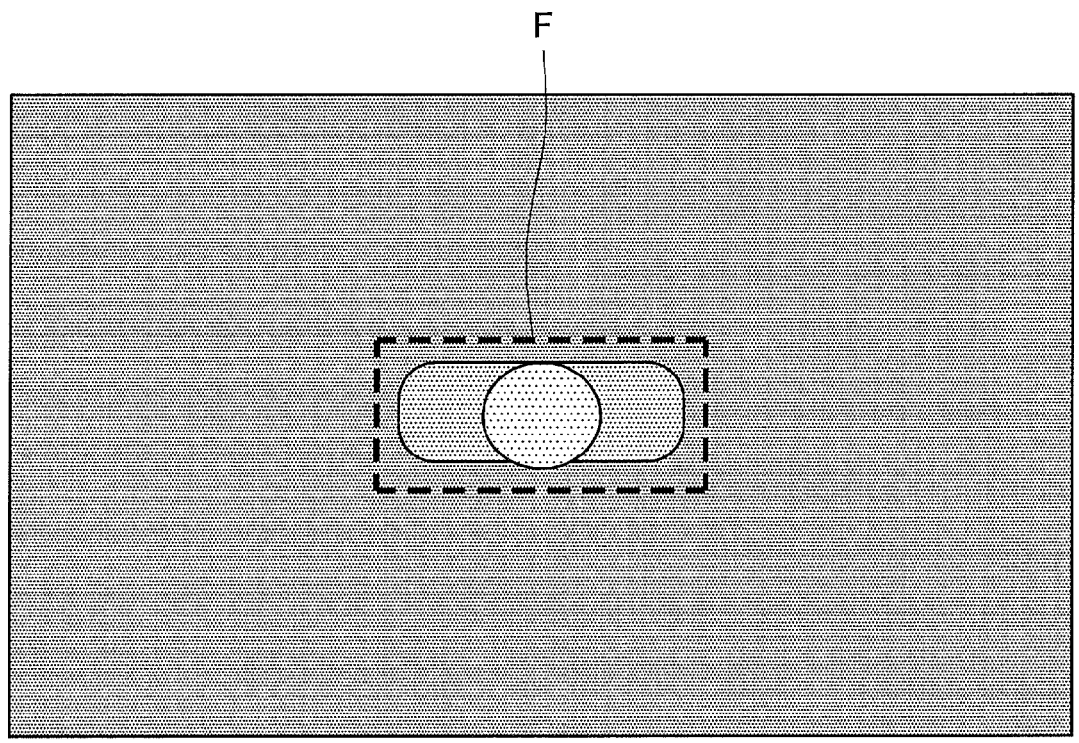
FIG. 6 is an explanatory view showing the detection of a person in the distance image.

The coordinate transformation unit 170 transforms position information (X, Y, Z) of the sensor coordinate system of the person detected by the person detection unit 160 into position information (x, y, z) of the world coordinate system by using sensor coordinate transformation data stored in the storage unit 150. If, for example, a person is detected in a region F in the distance image as shown in FIG. 6, the coordinate transformation unit 170 may transform position information (X, Y, Z) indicating the range of the region F into position information (x, y, z) of the world coordinate system or position information (X, Y, Z) indicating the center of the region F into position information (x, y, z) of the world coordinate system. In the description that follows, it is assumed that position information (x, y, z) in one world coordinate system corresponding to the region F in which a person is detected is obtained by the coordinate transformation unit 170.

The communication unit 180 is an interface with the imaging apparatus 20-1 and communicates with the imaging apparatus 20-1 wirelessly like using wireless LAN or via a cable. Particularly the communication unit 180 transmits position information (x, y, z) of the world coordinate system of a person obtained by the coordinate transformation unit 170 to the imaging apparatus 20-1.

[3-2. Configuration of Imaging Apparatus According to First Embodiment]

In the foregoing, the configuration of the distance image sensor 10-1 according to the first embodiment has been described with reference to FIGS. 4 to 6. Subsequently, the configuration of the imaging apparatus 20-1 according to the first embodiment has been described with reference to FIG. 7.

Figure 7:
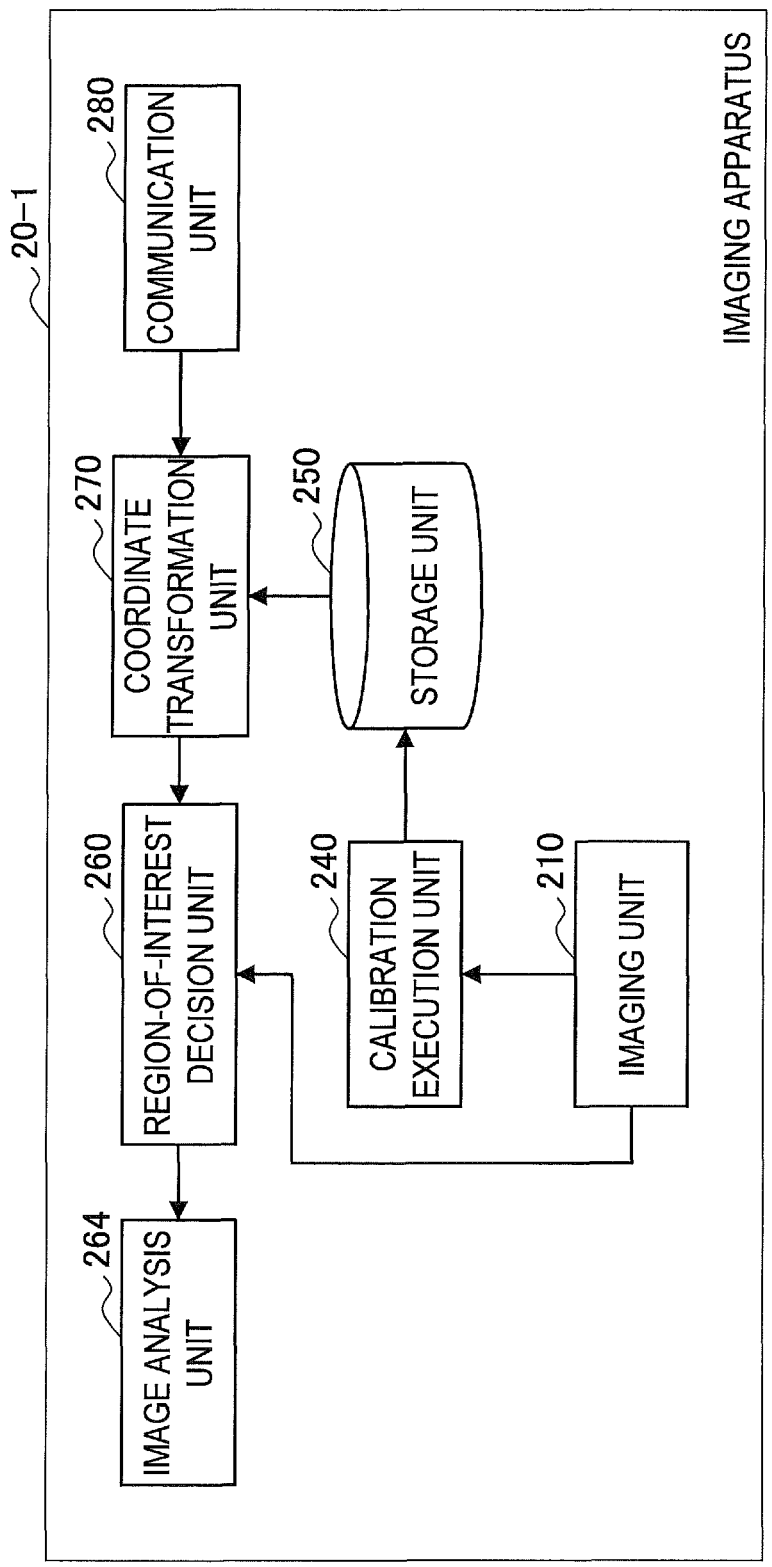
FIG. 7 is a functional block diagram showing the configuration of an imaging apparatus 20-1 according to the first embodiment.

FIG. 7 is a functional block diagram showing the configuration of the imaging apparatus 20-1 according to the first embodiment. As shown in FIG. 7, the imaging apparatus 20-1 according to the first embodiment includes an imaging unit 210, a calibration execution unit 240, a storage unit 250, a region-of-interest decision unit 260, an image analysis unit 264, a coordinate transformation unit 270, and a communication unit 280.

The imaging unit 210 includes an imaging optical system like a taking lens that condenses light emitted from a subject, a zoom lens and the like and an image sensor like CCD (Charge Coupled Device) or CMOS (Complementary Metal Oxide Semiconductor). In the imaging unit 210, a subject image is formed on an imaging surface of the image sensor by the imaging optical system and a captured image is acquired by the subject image formed on the imaging surface being converted into an electric signal by the image sensor.

The calibration execution unit 240 acquires world coordinate transformation data (second coordinate transformation data) showing the correspondence between position information (x, y, z) of the world coordinate system and each region in a captured image acquired by the imaging unit 210 by carrying out calibrations. That is, any three-dimensional space region of the object space in which an image is analyzed is associated with a corresponding region in a two-dimensional captured image. As an example, the calibration execution unit 240 can carry out the calibration in collaboration with the distance image sensor 10-1. This point will be described more concretely below with reference to FIG. 8.

Figure 8:
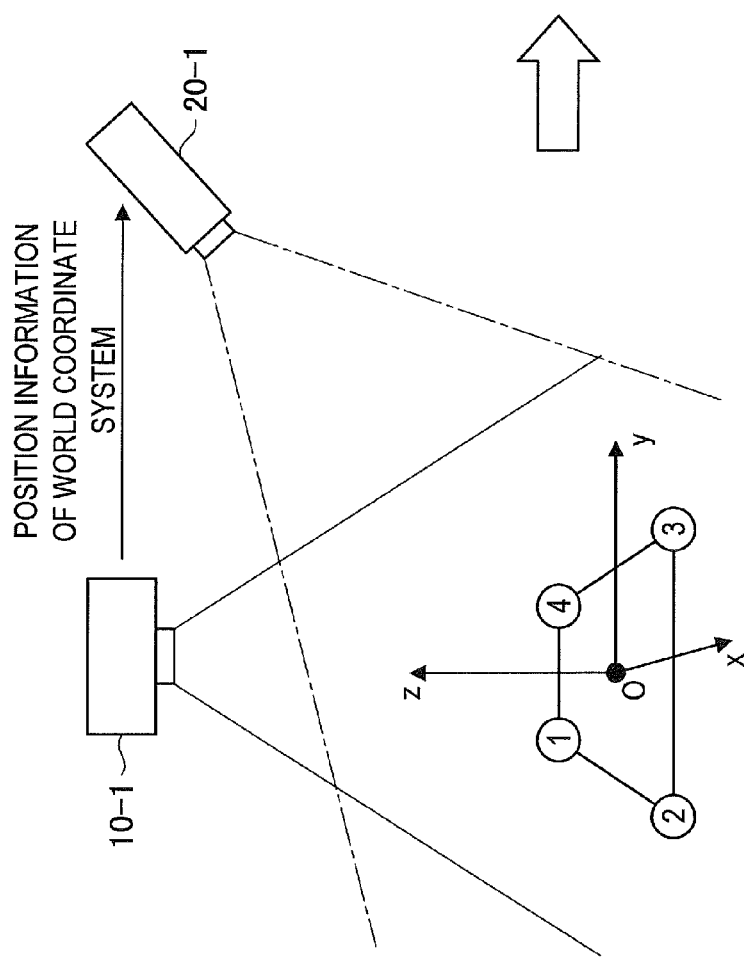
FIG. 8 is an explanatory view showing a concrete example of calibration of the imaging apparatus 20-1.

FIG. 8 is an explanatory view showing a concrete example of calibration of the imaging apparatus 20-1. First, as shown in the left figure in FIG. 8, when markers #1 to #4 are arranged in four places, the imaging apparatus 20-1 receives position information (x, y, z) of the world coordinate system of markers #1 to #4 from the calibrated distance image sensor 10-1.

Then, as shown in the right figure in FIG. 8, the calibration execution unit 240 acquires world coordinate transformation data from the relationship between the position information (x, y, z) of each of markers #1 to #4 and the positions of markers #1 to #4 in the captured image. The world coordinate transformation data is stored in the storage unit 250.

An example in which the position information (x, y, z) of the world coordinate system of markers #1 to #4 is received from the distance image sensor 10-1 is described above, but the position information (x, y, z) of the world coordinate system may be input by a person. Further, world coordinate transformation data can also be set by a person.

The communication unit 280 is an interface with the distance image sensor 10-1 and communicates with the distance image sensor 10-1 wirelessly like using wireless LAN or via a cable. Particularly the communication unit 280 according to the present embodiment receives position information (x, y, z) of the world coordinate system by the distance image sensor 10-1 during calibration processing or detection processing of a person.

The coordinate transformation unit 270 transforms position information (x, y, z) of the world coordinate system showing the position of a person as an interest space region received from the distance image sensor 10-1 by the communication unit 280 into position information indicating a pixel position in a captured image based on world coordinate transformation data stored in the storage unit 250. Thus, it is expected that a person appears in the position indicated by the position information obtained by the coordinate transformation unit 270.

The region-of-interest decision unit 260 decides a region of interest from a captured image based on position information obtained by the coordinate transformation unit 270. For example, the region-of-interest decision unit 260 may decide a rectangular region containing the pixel position indicated by the position information obtained by the coordinate transformation unit 270 as a region of interest. A concrete example of the region of interest decided by the region-of-interest decision unit 260 will be described below with reference to FIG. 9.

Figure 9:
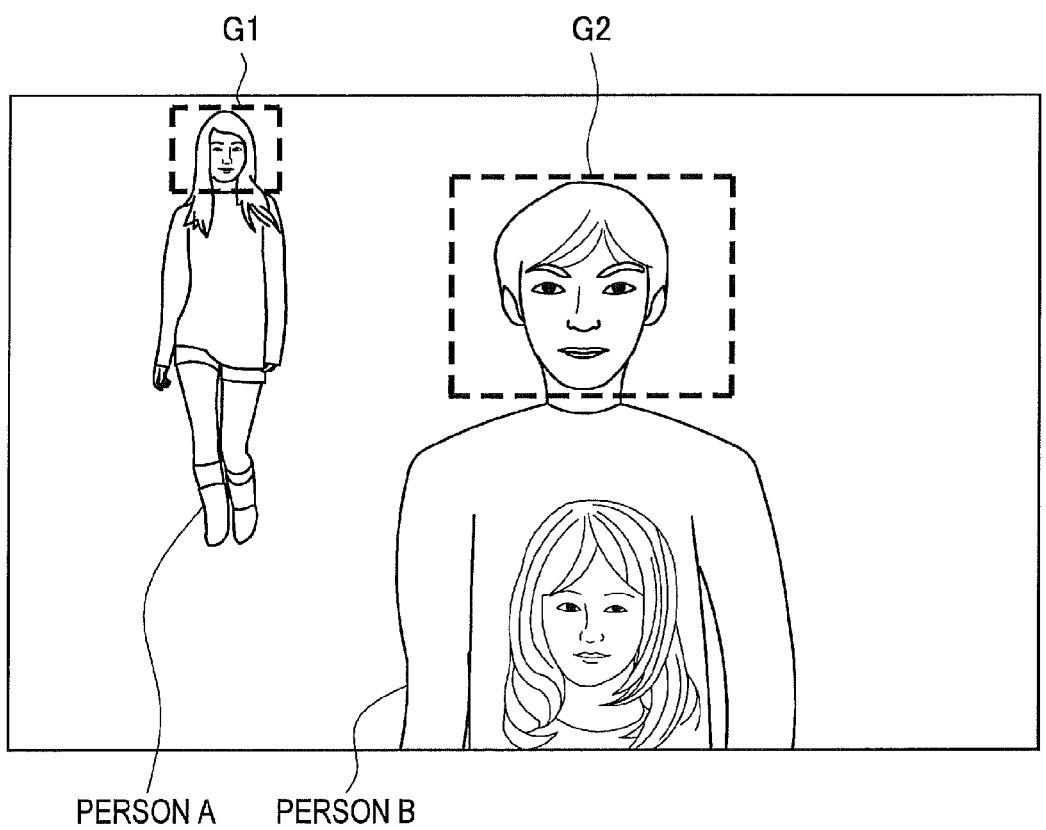
FIG. 9 is an explanatory view showing a concrete example of a region of interest.

FIG. 9 is an explanatory view showing a concrete example of a region of interest. As shown in FIG. 9, the region-of-interest decision unit 260 can decide a region G1 containing head of a person A in a distant place and a region G2 containing the head of a person B in the immediate vicinity as regions of interest. On the other hand, the face photo on a shirt worn by the person B is not detected as a person by the distance image sensor 10-1 and thus, a portion of the face photo does not become a region of interest.

As shown in FIG. 9, the size of a face in a captured image is different depending on the imaging distance of a person. Thus, the region-of-interest decision unit 260 may decide the size of a region of interest in accordance with the distance between a person and the imaging apparatus 20-1 estimated based on position information (x, y, z) of the world coordinate system. For example, as shown in FIG. 9, the region-of-interest decision unit 260 may make the size of the region of interest G2 of the person B positioned in front of the person A larger than that of the region of interest G1 of the person A.

The image analysis unit 264 makes a different analysis of an image in the region of interest decided by the region-of-interest decision unit 260 from an analysis of other image regions. That is, it is expected that a region of interest contains a face image of a person and thus, by making an analysis focusing on the region of interest, the image analysis unit 264 can obtain, in addition to the detection of a person, characteristic quantities such as the gender, age, height, face pattern and the like of a person. Further, the image analysis unit 264 can also obtain characteristic quantities of clothing of the applicable person by analyzing a region below the region of interest.

When analysis processing by matching processing on a region of interest is performed, like changing the size of a region of interest based on the imaging distance of a person as described above, the image analysis unit 264 may change the selection range of patterns used for analysis processing by matching processing based on relative distance information to the identified interest space region or the shape thereof. For example, the image analysis unit 264 may use only patterns of relatively small sizes for the region of interest G1 of the person A in the distant place and only patterns of relatively large sizes for the region of interest G2 of the person B in front.

According to the first embodiment of the present invention, as described above, the imaging apparatus 20-1 decides a region of interest from a captured image based on an analysis result of a distance image acquired by the distance image sensor 10-1 and analyzes the region of interest in the captured image. With the above configuration, erroneous detection of a face photo printed on a shirt can be prevented while curbing the processing load to detect a face from a captured image. Similarly, according to the first embodiment of the present invention, by using a distance image and a captured image interpolatingly, the accuracy of detecting a wheelchair user, a person holding a baby and the like can be improved.

[3-3. Operation of Image Processing System According to First Embodiment]

Subsequently, the operation of an image processing system according to the first embodiment will be described with reference to FIG. 10.

Figure 10:
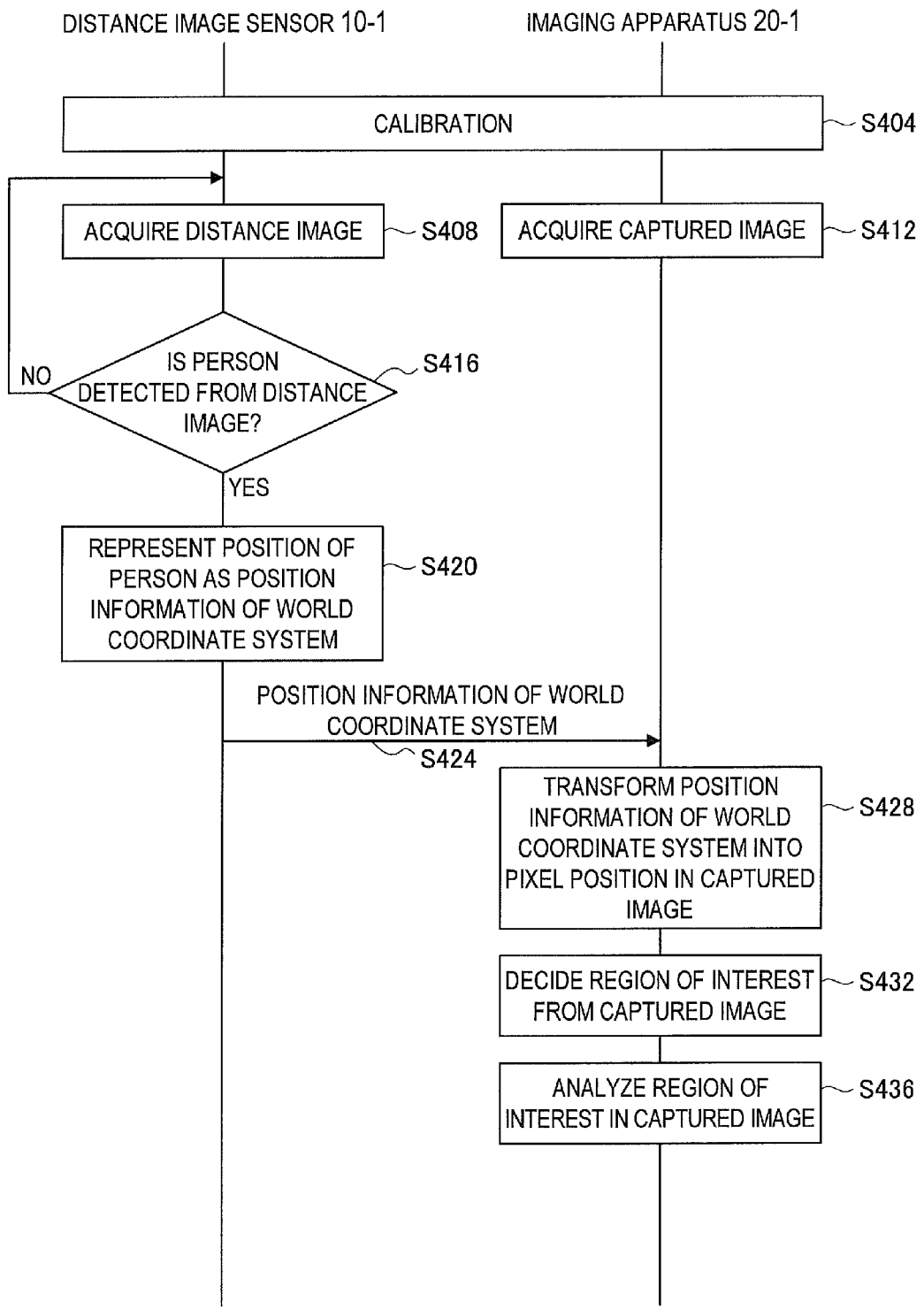
FIG. 10 is a sequence diagram showing an operation of an image processing system according to the first embodiment.

FIG. 10 is a sequence diagram showing the operation of an image processing system according to the first embodiment. As shown in FIG. 10, the calibration execution unit 140 of the distance image sensor 10-1 first carries out the calibration to acquire sensor coordinate transformation data and the calibration execution unit 240 of the imaging apparatus 20-1 first carries out the calibration to acquire world coordinate transformation data (S404). Incidentally, the distance image sensor 10-1 and the imaging apparatus 20-1 may carry out the calibration when the distance image sensor 10-1 or the imaging apparatus 20-1 is installed or periodically after the installation of the distance image sensor 10-1 or the imaging apparatus 20-1.

Then, the distance image acquisition unit 130 of the distance image sensor 10-1 starts to acquire a distance image (S408) and the imaging unit 210 of the imaging apparatus 20-1 starts to acquire a captured image (S412).

Then, when a person is detected from a distance image by the person detection unit 160 of the distance image sensor 10-1 as an interest space region (S416), the coordinate transformation unit 170 transforms position information (X, Y, Z) of the detected person in the sensor coordinate system into position information (x, y, z) of the world coordinate system by using sensor coordinate transformation data stored in the storage unit 150.

Subsequently, the communication unit 180 transmits the position information (x, y, z) of a person obtained by the coordinate transformation unit 170 to the imaging apparatus 20-1 (S424). The distance image sensor 10-1 may continue to transmit the position information (x, y, z) of a person to the imaging apparatus 20-1 or transmit the position information (x, y, z) in response to a request from the imaging apparatus 20-1. For example, the imaging apparatus 20-1 detects the absence/presence of any change of an imaged screen and if a change of the imaged screen is detected, the imaging apparatus 20-1 may request the transmission of position information (x, y, z) of a person from the distance image sensor 10-1.

On the other hand, the coordinate transformation unit 270 of the imaging apparatus 20-1 transforms the position information (x, y, z) of a person received from the distance image sensor 10-1 into the pixel position in the captured image by using world coordinate transformation data stored in the storage unit 250 (S428).

Then, the region-of-interest decision unit 260 of the imaging apparatus 20-1 decides a region of interest from the captured image based on the pixel position obtained by the coordinate transformation unit 270 (S432). Further, the image analysis unit 264 detects a person by performing an image analysis of the region of interest decided by the region-of-interest decision unit 260 to acquire characteristic quantities (S436).

[3-4. Modification]

An example in which the imaging apparatus 20-1 functions as an image processing apparatus that decides a region of interest and performs an image analysis is described above, but another apparatus can also be caused to function as an image processing apparatus according to the present embodiment. For example, by providing the region-of-interest decision unit 260, the image analysis unit 264 and the like in another apparatus communicating with the distance image sensor 10-1 and the imaging apparatus 20-1, the other apparatus can be caused to function as an image processing apparatus according to the present embodiment. Similarly, by providing the region-of-interest decision unit 260, the image analysis unit 264 and the like in the distance image sensor 10-1, the distance image sensor 10-1 can be caused to function as an image processing apparatus according to the present embodiment. The operation when the distance image sensor 10-1 functions as an image processing apparatus according to the present embodiment will be complemented as a modification with reference to FIG. 11.

Figure 11:
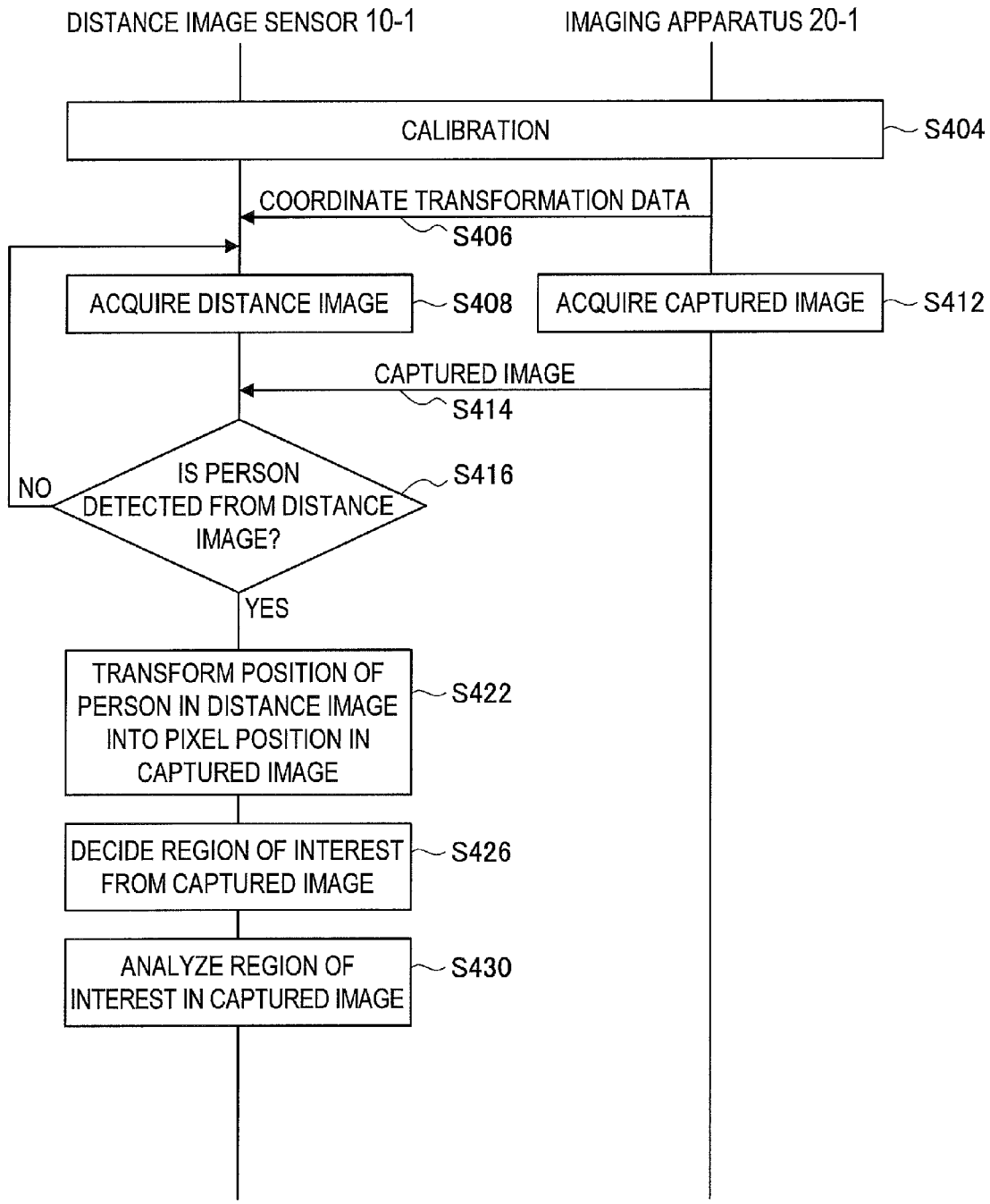
FIG. 11 is a sequence diagram showing the operation of a modification of the first embodiment.

FIG. 11 is a sequence diagram showing the operation of a modification of the first embodiment. As shown in FIG. 11, the calibration execution unit 140 of the distance image sensor 10-1 first carries out the calibration to acquire sensor coordinate transformation data and the calibration execution unit 240 of the imaging apparatus 20-1 first carries out the calibration to acquire world coordinate transformation data (S404). Then, the imaging apparatus 20-1 transmits world coordinate transformation data acquired by the calibration to the distance image sensor 10-1 (S406).

Then, the distance image acquisition unit 130 of the distance image sensor 10-1 starts to acquire a distance image (S408) and the imaging unit 210 of the imaging apparatus 20-1 starts to acquire a captured image (S412). The captured image acquired by the imaging unit 210 of the imaging apparatus 20-1 is transmitted from the communication unit 280 of the imaging apparatus 20-1 to the distance image sensor 10-1 (S414).

Then, when a person is detected from a distance image by the person detection unit 160 of the distance image sensor 10-1 as an interest space region (S416), the coordinate transformation unit 170 transforms position information (X, Y, Z) of the detected person in the sensor coordinate system into the pixel position in the captured image based on sensor coordinate transformation data and world coordinate transformation data (S422).

Then, the distance image sensor 10-1 decides a region of interest in the captured image received from the imaging apparatus 20-1 based on the pixel position obtained by the coordinate transformation unit 170 (S426). Further, the distance image sensor 10-1 detects a person and acquires characteristic quantities of the person by performing an image analysis of the region of interest (S430).

As described above, the main body realizing the function as an image processing apparatus according to the present embodiment is not limited to the imaging apparatus 20-1 and the function as an image processing apparatus according to the present embodiment can also be realized by the distance image sensor 10-1 or another apparatus.

<4. Second Embodiment>

Subsequently, the second embodiment of the present invention will be described. The imaging apparatus 20-2 according to the second embodiment of the present invention has some additional functions to the imaging apparatus 20-1 according to the first embodiment. The imaging apparatus 20-2 according to the second embodiment described above will be described in detail below.

Figure 12:
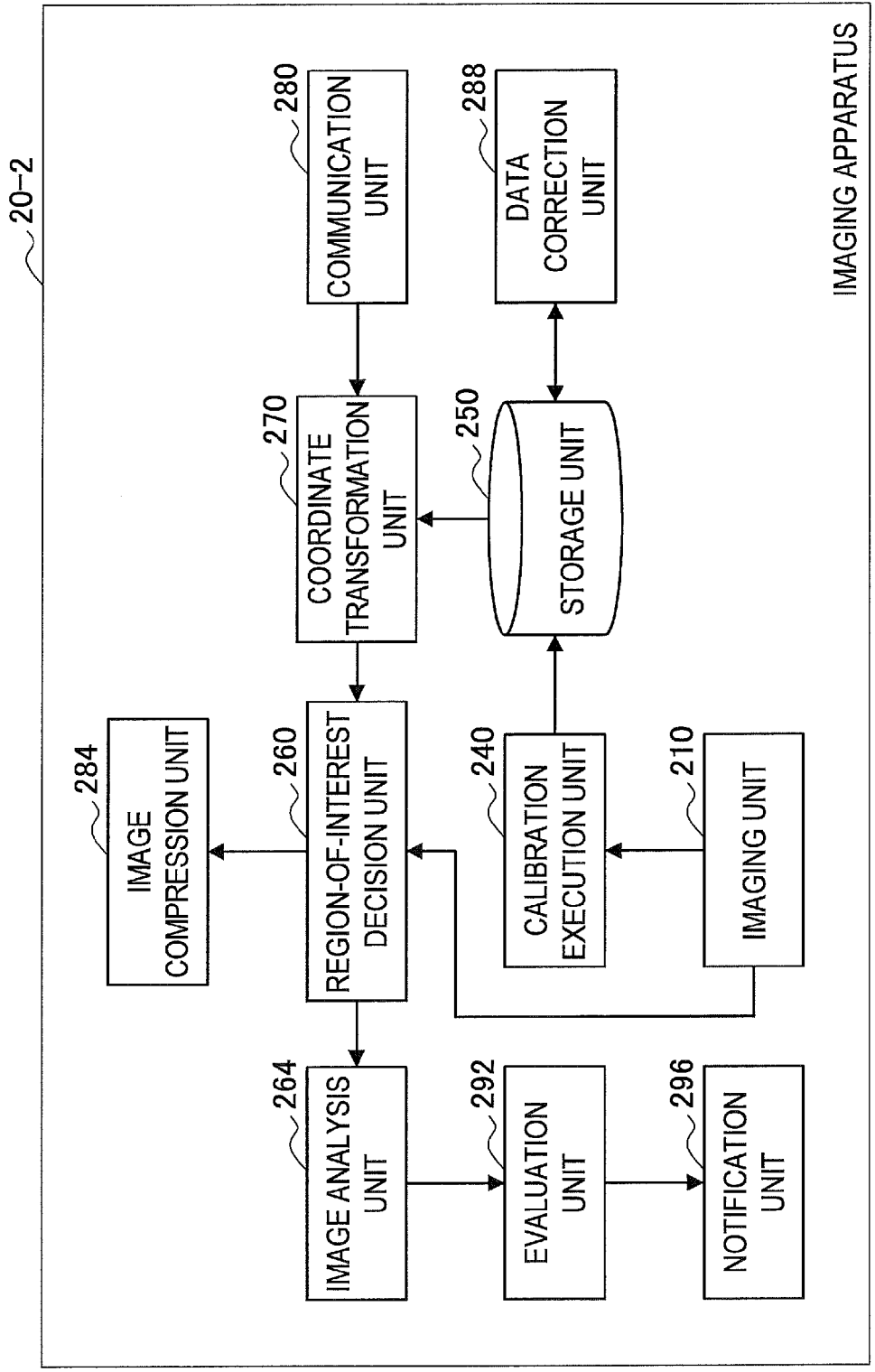
FIG. 12 is a functional block diagram showing the configuration of an imaging apparatus 20-2 according to a second embodiment.

FIG. 12 is a functional block diagram showing the configuration of the imaging apparatus 20-2 according to the second embodiment. As shown in FIG. 12, the imaging apparatus 20-2 according to the second embodiment includes the imaging unit 210, the calibration execution unit 240, the storage unit 250, the region-of-interest decision unit 260, the image analysis unit 264, the coordinate transformation unit 270, the communication unit 280, an image compression unit 284, a data correction unit 288, an evaluation unit 292, and a notification unit 296. The imaging unit 210, the calibration execution unit 240, the storage unit 250, the region-of-interest decision unit 260, the image analysis unit 264, the coordinate transformation unit 270, and the communication unit 280 are as described in the first embodiment and a detailed description thereof is omitted here.

(Image Compression)

The image compression unit 284 compresses a captured image acquired by the imaging unit 210. More specifically, the image compression unit 284 compresses a captured image such that the data rate in a surrounding region of a region of interest is lower than that of the region of interest. For example, the image compression unit 284 may compress only a surrounding region without lowering the data rate of the region of interest.

According to such a configuration, when a captured image is recorded, the recording capacity can be reduced while high resolution of the region of interest being maintained. Likewise, when a captured image is transferred, the communication traffic volume can be reduced while high resolution of the region of interest being maintained.

(Correction of Coordinate Transformation Data)

The data correction unit 288 corrects world coordinate transformation data stored in the storage unit 250 in accordance with image analysis results by the image analysis unit 264. If, for example, the orientation of the imaging unit 210 changes, the correspondence between position information (x, y, z) of the world coordinate system and each region in a captured image also changes and thus, the data correction unit 288 makes corrections to reflect the change of the orientation of the imaging unit 210 in world coordinate transformation data.

Figure 13:
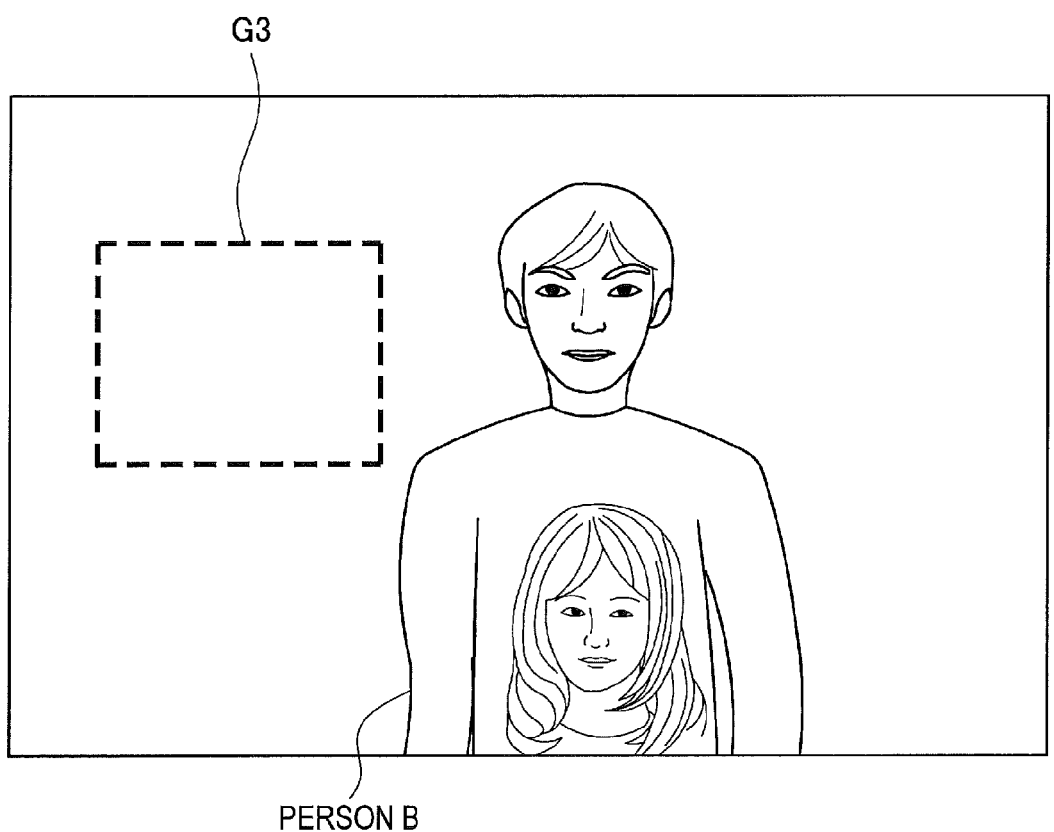
FIG. 13 is an explanatory view showing a concrete example of the region of interest in a captured image.

As a concrete example, when the correspondence between position information (x, y, z) of the world coordinate system and each region in a captured image changes, as shown in FIG. 13, a region G3 that is different from the head of the person B is considered to be decided as a region of interest. In this case, even if the region of interest G3 is analyzed, the image analysis unit 264 cannot detect the person B. The person B can be detected by the whole captured image being analyzed by the image analysis unit 264.

Thus, the data correction unit 288 may correct the world coordinate transformation data such that position information (x, y, z) of the world coordinate system received from the distance image sensor 10-1 corresponds to the head of the person B detected by the image analysis unit 264. By adopting such a configuration, reliability of the world coordinate transformation data can be maintained.

Also when the measuring direction of the distance image sensor 10-1 changes, the correspondence between position information (X, Y, Z) of the sensor coordinate system and position information (x, y, z) of the world coordinate system changes. In such a case, the imaging apparatus 20-1 may request corrections of sensor coordinate transformation data or recalibration from the distance image sensor 10-1.

(Error Notification)

When the imaging direction or the installation position changes slightly, as described above, it is possible to take measures by correcting coordinate transformation data. On the other hand, when the imaging direction or the installation position changes significantly and the target person does not appear in the captured image at all, it is difficult to make the above corrections.

Thus, the evaluation unit 292 evaluates reliability of sensor coordinate transformation data or world coordinate transformation data based on image analysis results by the image analysis unit 264. If a person contained in one of a distance image and a captured image is not contained in the other, reliability of sensor coordinate transformation data or world coordinate transformation data is evaluated as damaged.

When reliability of sensor coordinate transformation data or world coordinate transformation data is evaluated by the evaluation unit 292 as damaged, the notification unit 296 makes a notification of an error occurrence. For example, the notification unit 296 may transmit information for the notification of an error occurrence to a predetermined address or make a notification of an error occurrence by an alarm sound. The notification unit 296 may also make a notification of an error occurrence by light emission of a predetermined LED or the like so that the error occurrence can visually be grasped from outside.

By adopting such a configuration, an administrator of an image processing system is expected to recognize an error occurrence and carry out the calibration to reacquire sensor coordinate transformation data or world coordinate transformation data.

(Sort-Out of the Second Embodiment)

According to the second embodiment of the present invention, as described above, when a captured image is recorded, the recording capacity can be reduced while high resolution of the region of interest being maintained due to the function of the image compression unit 284. Likewise, when a captured image is transferred, the communication traffic volume can be reduced while high resolution of the region of interest being maintained.

Also, the data correction unit 288, the evaluation unit 292, and the notification unit 296 can achieve the function of maintaining reliability of sensor coordinate transformation data and world coordinate transformation data.

<5. Third Embodiment>

While an example in which the one imaging apparatus 20 is arranged for the one distance image sensor 10 is described in the first and second embodiments, as will be described as the third embodiment, it is possible to arrange a plurality of the imaging apparatuses 20 for the one distance image sensor 10. Details will be described below.

Figure 14:
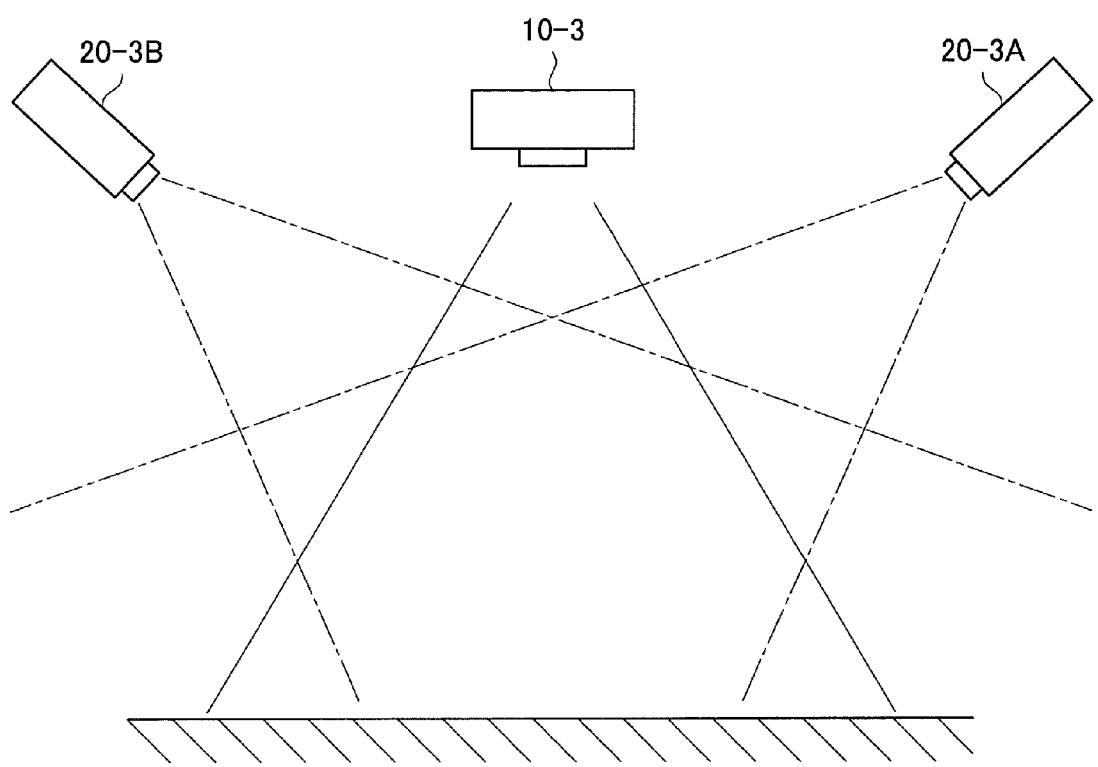
FIG. 14 is an explanatory view showing the configuration of the image processing system according to a third embodiment.

FIG. 14 is an explanatory view showing the configuration of the image processing system according to the third embodiment. As shown in FIG. 14, the image processing system according to the third embodiment includes a distance image sensor 10-3, an imaging apparatus 20-3A, and an imaging apparatus 20-3B.

The distance image sensor 10-3 includes a functional block common to that of the distance image sensor 10-1 according to the first embodiment shown in FIG. 4. That is, in the distance image sensor 10-3, the distance image acquisition unit 130 acquires a distance image of the object space, the person detection unit 160 detects a person from the distance image as an interest space region, and the coordinate transformation unit 170 transforms a person's position from the sensor coordinate system into the world coordinate system. Then, the communication unit 180 of the distance image sensor 10-3 according to the second embodiment transmits the person's position transformed into the world coordinate system to the imaging apparatus 20-3A and the imaging apparatus 20-3B. For example, the communication unit 180 may directly broadcast or multicast the person's position transformed into the world coordinate system to the imaging apparatus 20-3A and the imaging apparatus 20-3B wirelessly or via a cable.

The imaging apparatus 20-3A and the imaging apparatus 20-3B image the object space of the distance image sensor 10 from mutually different directions. The imaging apparatus 20-3A and the imaging apparatus 20-3B has a functional block common to that of the imaging apparatus 20-1 according to the first embodiment shown in FIG. 7.

That is, in the imaging apparatus 20-3A and the imaging apparatus 20-3B, the coordinate transformation unit 270 transforms position information of a person received from the distance image sensor 10-3 into the pixel position in a captured image, the region-of-interest decision unit 260 decides a region of interest based on the pixel position obtained from the coordinate transformation unit 270, and the image analysis unit 264 performs an image analysis of the region of interest.

In the third embodiment, as described above, a person is detected from a plurality of captured images obtained by imaging the object space from different directions. Thus, even if a person is hidden in one of captured images or a person's back appears in one of captured images, the person may be captured in other captured images. Therefore, according to the third embodiment, it becomes possible to detect more persons present in the object space and obtain characteristic quantities of each person.

(Supplementary Remarks)

An example in which two imaging apparatuses 20-3 are arranged for one distance image sensor 10-3 is described in FIG. 14, but the number of the imaging apparatuses 20-3 arranged for the one distance image sensor 10-3 is not limited to two. For example, the six imaging apparatuses 20-3 may be arranged for the one distance image sensor 10-3 like surrounding the object space or the more imaging apparatuses 20-3 may be arranged.

An example in which the distance image sensor 10-3 directly transmits position information of a person to a plurality of the imaging apparatuses 20-3 is described above, but the present embodiment is not limited to such an example. For example, the distance image sensor 10-3 may transmit position information of a person to a management server that manages the system so that the management server transmits the position information of a person to the plurality of imaging apparatuses 20-3.

In this case, if the distance image sensor 10-3 successfully detects also the person's orientation by, for example, the Haar-like filter, the management server may transmit the position information of the person to only the imaging apparatus 20-3 arranged in a position capable of capturing the person's face.

If each captured image acquired by the plurality of imaging apparatuses 20-3 is also collected by the management server, the management server may select captured images acquired by the imaging apparatus 20-3 arranged in a position capable of capturing a person's face as processing objects (objects for the decision of a region of interest and the image analysis).

<6. Fourth Embodiment>

Subsequently, the fourth embodiment of the present invention will be described. According to the fourth embodiment, a behavior pattern of a person can be detected by arranging a pair of the distance image sensor 10 and the imaging apparatus 20 in a plurality of places. The fourth embodiment will be described in detail below.

(System Configuration)

Figure 15:
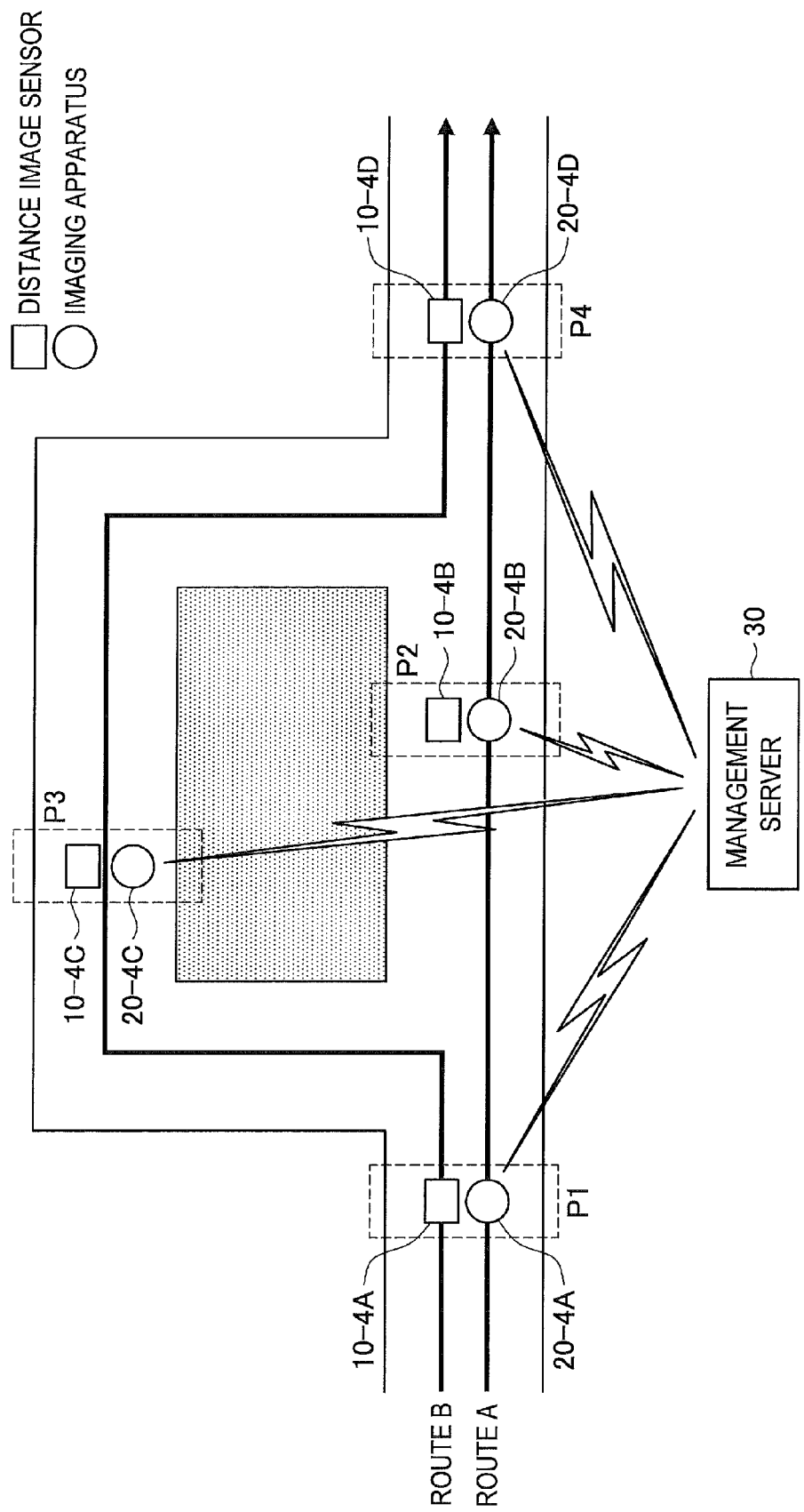
FIG. 15 is an explanatory view showing the configuration of the image processing system according to a fourth embodiment.

FIG. 15 is an explanatory view showing the configuration of the image processing system according to the fourth embodiment. As shown in FIG. 15, the image processing system according to the fourth embodiment includes distance image sensors 10-4A to 10-4D, imaging apparatuses 20-4A to 20-4D, and the management server 30.

The distance image sensors 10-4A to 10-4D and the imaging apparatuses 20-4A to 20-4D are arranged in a plurality of places in a distributed manner. For example, as shown in FIG. 15, a pair of the distance image sensor 10-4A and the imaging apparatus 20-4A is arranged in place P1, a pair of the distance image sensor 10-4B and the imaging apparatus 20-4B is arranged in place P2, a pair of the distance image sensor 10-4C and the imaging apparatus 20-4C is arranged in place P3, and a pair of the distance image sensor 10-4D and the imaging apparatus 20-4D is arranged in place P4.

As described in the first embodiment, each of the distance image sensors 10-4 and each of the imaging apparatuses 20-4 detect a person passing through each place in collaboration. Then, each of the imaging apparatuses 20-4 transmits detection information including characteristic quantities of persons to the management server 30.

The management server 30 accumulates detection information received from each of the imaging apparatuses 20-4 and analyzes behavior patterns of the same person based on accumulated detection information. The configuration of the management server 30 will be described below with reference to FIG. 16.

(Configuration of the Management Server)

Figure 16:
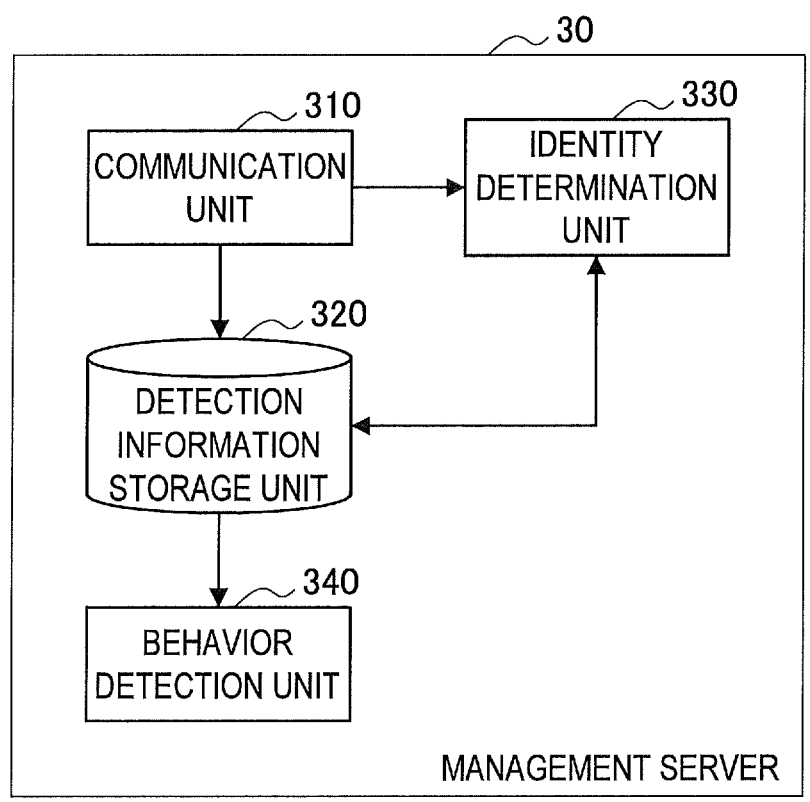
FIG. 16 is a functional block diagram showing the configuration of a management server 30.

FIG. 16 is a functional block diagram showing the configuration of the management server 30. As shown in FIG. 16, the management server 30 includes a communication unit 310, a detection information storage unit 320, an identity determination unit 330, and a behavior detection unit 340.

The communication unit 310 is an interface with the distance image sensor 10-4 and the imaging apparatus 20-4 and communicates with the distance image sensor 10-4 and the imaging apparatus 20-4 wirelessly or via a cable. Particularly, the communication unit 310 according to the present embodiment receives detection information of a person from, for example, the imaging apparatus 20-4.

The detection information storage unit 320 stores detection information of a person received by the communication unit 310. The detection information of a person will be described more concretely below with reference to FIG. 17.

FIG. 17 is an explanatory view showing a concrete example of detection information. As shown in FIG. 17, the detection information of a person contains, for example, the detection ID, characteristic quantity, detection position, detection time and the like. The detection ID is an ID to identify each piece of detection information, the characteristic quantity shows a characteristic of the person obtained by analyzing a captured image, the detection place is a place where the person is detected, that is, the arrangement place of the imaging apparatus 20-4 as the transmission source of the detection information, and the detection time shows the time when the person is detected. For example, detection information "1" shows that a person having a characteristic quantity A is detected in place P1 at 10:05 on Aug. 1, 2011.

The identity determination unit 330 shown in FIG. 16 compares the characteristic quantity of each piece of detection information accumulated in the detection information storage unit 320 to determine the identity of persons involved in each piece of detection information. If, for example, the characteristic quantity A, the characteristic quantity A', and the characteristic quantity a are the same or similar, the identity determination unit 330 determines that detection information "1", detection information "3", and detection information "4" shown in FIG. 17 and containing respective characteristic quantities are detection information of the same person J. Then, the identity determination unit 330 attaches the same person ID to the detection information "1", the detection information "3", and the detection information "4". Similarly, the identity determination unit 330 determines that detection information "2", detection information "6", and detection information "7" are detection information of the same person K.

Based on detection information of the same person determined by the identity determination unit 330, the behavior detection unit 340 detects a behavior pattern of the person.

For example, based on a history of the detection place of the same person, the behavior detection unit 340 detects a moving route of the person. More specifically, based on the detection information "1", the detection information "3", and the detection information "4" about the person J, the identity determination unit 330 detects that the person J moved on route A P1→P2→P4 shown in FIG. 15. Similarly, based on the detection information "2", the detection information "5", and the detection information "6" about the person K, the identity determination unit 330 detects that the person K moved on route B P1→P3→P4 shown in FIG. 15.

Based on a history of the detection place and the detection time of the same person, the behavior detection unit 340 can also detect the moving speed and a place to visit of the person.

According to the fourth embodiment, therefore, a behavior pattern of a person can be detected by arranging a pair of the distance image sensor 10-4 and the imaging apparatus 20-4 in a plurality of places. In addition, detection results of behavior patterns can be utilized for various uses. For example, the optimum service can be provided to each person by using detection results of behavior patterns. Also, movement and traffic conditions in a target area can be grasped and security can be improved.

<7. Summary>

According to the first embodiment of the present invention, as described above, the imaging apparatus 20-1 decides a region of interest from a captured image based on an analysis result of a distance image acquired by the distance image sensor 10-1 and analyzes the region of interest in the captured image. With the above configuration, erroneous detection of a face photo printed on a shirt can be prevented while curbing the processing load to detect a face from a captured image. Similarly, according to the first embodiment of the present invention, by using a distance image and a captured image interpolatingly, the accuracy of detecting a wheelchair user, a person holding a baby and the like can be improved.

According to the second embodiment of the present invention, when a captured image is recorded, the recording capacity can be reduced while high resolution of the region of interest being maintained due to the function of the image compression unit 284. Likewise, when a captured image is transferred, the communication traffic volume can be reduced while high resolution of the region of interest being maintained. Also, the data correction unit 288, the evaluation unit 292, and the notification unit 296 according to the second embodiment can achieve the function of maintaining reliability of sensor coordinate transformation data and world coordinate transformation data.

In the third embodiment, a person is detected from a plurality of captured images obtained by imaging the object space from different directions. Thus, even if a person is hidden in one of captured images or a person's back appears in one of captured images, the person may be captured in other captured images. Therefore, according to the third embodiment, it becomes possible to detect more persons present in the object space and obtain characteristic quantities of each person.

According to the fourth embodiment of the present invention, a behavior pattern of a person can be detected by arranging a pair of the distance image sensor 10-4 and the imaging apparatus 20-4 in a plurality of places.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the distance image sensor 10 and the imaging apparatus 20 may be arranged on a movable table or rail. According to such a configuration, it becomes possible to avoid overlapping of persons by appropriately moving the distance image sensor 10 and the imaging apparatus 20.

An example in which position information of the sensor coordinate system of the distance image sensor 10 is transformed into a pixel position in a captured image via the world coordinate system is described, but the present invention is not limited to such an example. For example, the imaging apparatus 20 may acquire coordinate transformation data to transform the sensor coordinate system of the distance image sensor 10 directly into a pixel position in a captured image by calibration. The calibration can be carried out by, for example, position information of the sensor coordinate system of markers being transmitted to the imaging apparatus 20 by the distance image sensor 10 and marker positions in the captured image and the position information of the sensor coordinate system of markers being compared by the imaging apparatus 20.

Each step in processing of an image processing system herein, or the distance image sensor 10 and the imaging apparatus 20 does not necessarily have to be executed chronologically in the order described as a sequence diagram. For example, each step in processing of the distance image sensor 10 and the imaging apparatus 20 may be executed in an order that is different from the order described as a sequence diagram or in parallel.

In addition, a computer program causing hardware such as a CPU, ROM, and RAM contained in the distance image sensor 10 or the imaging apparatus 20 to achieve the function equivalent to each configuration of the distance image sensor 10 and the imaging apparatus 20 described above can be created. A storage medium caused to store the computer program is also provided.

REFERENCE SIGNS LIST

10 distance image sensor
20 imaging apparatus
30 management server
110 light-emitting unit
120 light-receiving unit
130 distance image acquisition unit
140, 240 calibration execution unit
150, 250 storage unit
160 person detection unit
170, 270 coordinate transformation unit
180, 280, 310 communication unit
210 imaging unit
260 region-of-interest decision unit
264 image analysis unit
284 image compression unit
288 data correction unit
292 evaluation unit
296 notification unit
320 detection information storage unit
330 identity determination unit
340 behavior detection unit

The invention claimed is:

1. An image processing apparatus comprising:
   a region-of-interest decision unit that
      obtains a distance image that is measured by a distance image sensor located above an object space and that includes information of a distance between the distance image sensor and an object vertically below the distance image sensor in the object space,
      obtains an image that is captured by an imaging apparatus from a non-vertical direction,
      identifies an interest space region in which the object is likely to be present based on the distance image, and
      identifies a region of interest in the captured image corresponding to the identified interest space region; and an image analysis unit that performs first image analysis on the identified region of interest and second image analysis on regions of the captured image other than the identified region of interest, the second image analysis being different from the first image analysis, wherein the image analysis unit performs the first or second image analysis by performing matching processing on the identified region of interest, and the image analysis unit changes a selection range of patterns used for the first or second image analysis by performing pattern recognition of the region of interest based on relative distance information between the imaging apparatus supplying the captured image and the interest space region identified based on the distance image.

2. The image processing apparatus according to claim 1, wherein the region-of-interest decision unit analyzes the distance image to obtain position information of a person in the object space, and decides a region corresponding to the position information of the person in the captured image as the region of interest.

3. The image processing apparatus according to claim 1, further comprising an image compression unit that compresses the captured image such that a data rate of a surrounding region of the region of interest is lower than the data rate of the region of interest.

4. An image processing apparatus comprising:
a region-of-interest decision unit that
obtains a distance image that is measured by a distance image sensor located above an object space and that includes information of a distance between the distance image sensor and an object vertically below the distance image sensor in the object space,
obtains an image that is captured by an imaging apparatus from a non-vertical direction,
identifies an interest space region in which the object is likely to be present based on the distance image, and
identifies a region of interest in the captured image corresponding to the identified interest space region; and
an image analysis unit that performs first image analysis on the identified region of interest and second image analysis on regions of the captured image other than the identified region of interest, the second image analysis being different from the first image analysis, wherein
the region-of-interest decision unit further analyzes the distance image to obtain position information of a person in the object space, and decides a region corresponding to the position information of the person in the captured image as the region of interest,
the region-of-interest decision unit further transforms the position information of the person, which is position information in a sensor coordinate system, based on first coordinate transformation data to thereby obtain position information of the person in a three-dimensional coordinate system,
the image processing apparatus further includes a storage unit that stores second coordinate transformation data showing a correspondence between the position information in the three-dimensional coordinate system and each region in the captured image, and
the region-of-interest decision unit decides the region of interest by determining the region in the captured image corresponding to the position information of the person in the three-dimensional coordinate system based on the second coordinate transformation data.

5. The image processing apparatus according to claim 4, wherein the region-of-interest decision unit decides a size of the region of interest in accordance with a relative distance between the person estimated from the position information of the person in the three-dimensional coordinate system and the imaging apparatus.

6. The image processing apparatus according to claim 4, further comprising:
an evaluation unit that evaluates reliability of the first coordinate transformation data or the second coordinate transformation data based on an analysis result of the region of interest by the image analysis unit; and
a notification unit that makes an error notification when the reliability of the first coordinate transformation data or the second coordinate transformation data is evaluated as damaged.

7. The image processing apparatus according to claim 4, further comprising:
a calibration execution unit that acquires the first coordinate transformation data or the second coordinate transformation data by calibration; and
a data correction unit that corrects the first coordinate transformation data or the second coordinate transformation data acquired by the calibration execution unit based on an analysis result of the region of interest by the image analysis unit.

8. An image processing apparatus comprising:
a region-of-interest decision unit that
obtains a distance image that is measured by a distance image sensor located above an object space and that includes information of a distance between the distance image sensor and an object vertically below the distance image sensor in the object space,
obtains an image that is captured by an imaging apparatus from a non-vertical direction,
identifies an interest space region in which the object is likely to be present based on the distance image, and
identifies a region of interest in the captured image corresponding to the identified interest space region; and
an image analysis unit that performs first image analysis on the identified region of interest and second image analysis on regions of the captured image other than the identified region of interest, the second image analysis being different from the first image analysis,
wherein the region-of-interest decision unit further analyzes the distance image to obtain position information of a person in the object space, and decides a region corresponding to the position information of the person in the captured image as the region of interest,
wherein the imaging apparatus is one of a plurality of imaging apparatuses that each image the object space from a different direction, and
wherein the region-of-interest decision unit decides the region of interest of the captured image corresponding to a face of the person.

9. An image processing apparatus comprising:
a region-of-interest decision unit that
obtains a distance image that is measured by a distance image sensor located above an object space and that includes information of a distance between the distance image sensor and an object vertically below the distance image sensor in the object space,
obtains an image that is captured by an imaging apparatus from a non-vertical direction,
identifies an interest space region in which the object is likely to be present based on the distance image, and identifies a region of interest in the captured image corresponding to the identified interest space region; and an image analysis unit that performs first image analysis on the identified region of interest and second image analysis on regions of the captured image other than the identified region of interest, the second image analysis being different from the first image analysis, wherein the region-of-interest decision unit further analyzes the distance image to obtain position information of a person in the object space, and decides a region corresponding to the position information of the person in the captured image as the region of interest, the imaging apparatus is one of a plurality of imaging apparatuses that each image the object space from a different direction, and the image processing apparatus further includes
   a communication unit that communicates with the distance image sensor and each of the imaging apparatuses; and
   an identity determination unit that compares the decided region in the captured image acquired by the imaging apparatus and a decided region in another captured image acquired by one of the other imaging apparatuses to determine an identity of the person contained in both captured images.

10. An image processing method comprising:

obtaining a distance image that is measured by a distance image sensor located above an object space and that includes information of a distance between the distance image sensor and an object vertically below the distance image sensor in the object space;

obtaining an image that is captured by an imaging apparatus from a non-vertical direction;

identifying an interest space region in which the object is likely to be present based on the distance image, and identifying a region of interest in the captured image corresponding to the identified interest space region; and performing first image analysis on the identified region of interest and second image analysis on image regions of the captured image other than the identified region of interest, the second image analysis being different from the first image analysis, wherein the performing first image analysis and second image analysis includes
   performing matching processing on the identified region of interest, and
   changing a selection range of patterns used for each of the first image analysis and the second image analysis by performing pattern recognition of the region of interest based on relative distance information between the imaging apparatus supplying the captured image and the identified interest space region.

11. An image processing system, comprising:

a distance image sensor, located above an object space, that acquires a distance image including information of a distance between the distance image sensor and an object vertically below the distance image sensor in the object space;

an imaging apparatus that captures an image of the object in the object space from a non-vertical direction;

a region-of-interest decision unit that
   identifies an interest space region in which the object is likely to be present based on the distance image acquired by the distance image sensor, and
   identifies a region of interest in the captured image corresponding to the identified interest space region; and an image analysis unit that performs an image analysis on the identified region of interest, by
   performing matching processing on the identified region of interest, and
   changing a selection range of patterns used for the image analysis by performing pattern recognition of the region of interest based on relative distance information between the imaging apparatus supplying the captured image and the identified interest space region.

* * * * *